US007580081B2

(12) United States Patent
Tamano et al.

(10) Patent No.: US 7,580,081 B2
(45) Date of Patent: Aug. 25, 2009

(54) SETUP LEVEL AND DYNAMIC RANGE ADJUSTMENT OF AN IMAGE DISPLAY APPARATUS

(75) Inventors: Kouhei Tamano, Tokyo (JP); Kazuaki Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 739 days.

(21) Appl. No.: 11/266,425

(22) Filed: Nov. 4, 2005

(65) Prior Publication Data

US 2006/0227064 A1 Oct. 12, 2006

(30) Foreign Application Priority Data

Apr. 7, 2005 (JP) ............................ 2005-110895

(51) Int. Cl.
*H04N 5/52* (2006.01)

(52) U.S. Cl. ...................................................... 348/678

(58) Field of Classification Search ................. 348/678, 348/679, 674, 675
See application file for complete search history.

(56) References Cited

U.S. PATENT DOCUMENTS 6,657,619 B1 * 12/2003 Shiki .......................... 345/204
6,795,053 B1 9/2004 Funamoto et al.
2002/0063788 A1 * 5/2002 Kurashige et al. ........... 348/273
2004/0179132 A1 * 9/2004 Fujino et al. ................ 348/363
2004/0252204 A1 * 12/2004 Kurane .................... 348/222.1

FOREIGN PATENT DOCUMENTS

| | | | |
|---|---|---|---|
| JP | 2003-179778 | A | 6/2003 |
| JP | 2003-309741 | A | 10/2003 |
| WO | WO-0068926 | A1 | 11/2000 |

* cited by examiner

*Primary Examiner*—Paulos M Natnael
(74) *Attorney, Agent, or Firm*—Birch, Stewart, Kolasch & Birch, LLP

(57) ABSTRACT

An image display apparatus includes an input range discriminator which discriminates a type of an input digital video signal, on the basis of a setup level and a dynamic range of the digital video signal; a signal processor which corrects the setup level and the dynamic range of the digital video signal, on the basis of a result of the discrimination made by the input range discriminator; and a display device which displays a picture based on the digital video signal corrected by the signal processor.

8 Claims, 8 Drawing Sheets

FIG.8A

| LUT1 (FULL RANGE) | |
|---|---|
| INPUT (8bit) | OUTPUT (12bit) |
| 0 | 0 |
| 1 | 16 |
| 2 | 32 |
| 3 | 48 |
| • | • |
| • | • |
| • | • |
| 14 | 224 |
| 15 | 240 |
| 16 | 256 |
| 17 | 273 |
| • | • |
| • | • |
| • | • |
| 233 | 3741 |
| 234 | 3757 |
| 235 | 3773 |
| 236 | 3789 |
| • | • |
| • | • |
| • | • |
| 253 | 4062 |
| 254 | 4078 |
| 255 | 4095 |

FIG.8B

| LUT2 (LIMITED RANGE) | |
|---|---|
| INPUT (8bit) | OUTPUT (12bit) |
| 0 | 0 |
| 1 | 0 |
| 2 | 0 |
| 3 | 0 |
| • | • |
| • | • |
| • | • |
| 14 | 0 |
| 15 | 0 |
| 16 | 0 |
| 17 | 18 |
| • | • |
| • | • |
| • | • |
| 233 | 4057 |
| 234 | 4076 |
| 235 | 4095 |
| 236 | 4095 |
| • | • |
| • | • |
| • | • |
| 253 | 4095 |
| 254 | 4095 |
| 255 | 4095 |

SETUP LEVEL AND DYNAMIC RANGE ADJUSTMENT OF AN IMAGE DISPLAY APPARATUS

BACKGROUND OF THE INVENTION

1. Field of the Invention

The present invention relates to an image display apparatus equipped with a digital interface such as Digital Visual Interface (DVI) or High-Definition Multimedia Interface (HDMI, registered trademark), and particularly, to the adjustment of a setup level and a dynamic range of an input digital video signal.

2. Description of the Related Art

Since individual local broadcast standards specify their setup levels of the analog video signal, conventional image display apparatuses perform a setup cancel operation uniquely defined in each region. The term "setup level" means a difference between the pedestal level and the black level of the video signal. In the United States, the setup-level is 7.5%, and a setup cancel operation of 7.5% is carried out, for instance. In Japan, the setup level is 0%, and a setup cancel operation of 0% is carried out. When a setup cancel operation is carried out for a video signal with a setup level added, the lower limit of quantization of the AD converter is shifted by an amount of the setup cancel. Refer to Japanese Patent Kokai (Laid-open) Publication No. 2001-339621 (pages 4 to 5 and FIG. 1), for instance.

Digital interfaces such as DVI and HDMI (registered trademark) incorporated in digital versatile disk (DVD) players and set-top boxes (STB) are becoming pervasive. The RGB signals output from the digital interfaces are divided into two types by dynamic range: a full range and a limited range. The dynamic range to be used is determined by each apparatus, irrespective of the region, and both dynamic ranges are used in a single region. With a full range 8-bit video signal, all of the 256 values (i.e., quantization bit number) formed by 8 bits are assigned to the gray levels respectively, where a level 0 is black and a level 255 is white. With a limited range video signal, a level 16 is black, and a level 235 is white, and part of the 8-bit values are used.

If a limited range video signal is input to a conventional image display apparatus supporting the full range, problems known as "dull black" (increase in brightness of black) and "dull white" (decrease in brightness of white) occur. If a full range video signal is input to a conventional image display apparatus supporting the limited range, problems known as "black crushing" (loss of grayscale details in a dark area) and "white crushing" (loss of grayscale details in a light area) occur.

SUMMARY OF THE INVENTION

It is an object of the present invention to provide an image display apparatus that can display a picture at a brightness level with a high fidelity to the input digital video signal, regardless of the setup level and the dynamic range of the input digital video signal.

An image display apparatus of the present invention includes an input range discriminator which discriminates a type of an input digital video signal, on the basis of a setup level and a dynamic range of the digital video signal; a signal processor which corrects the setup level and the dynamic range of the digital video signal, on the basis of a result of the discrimination made by the input range discriminator; and a display device which displays a picture based on the digital video signal corrected by the signal processor.

With the present invention, the type of an input digital video signal is classified by the setup level and the dynamic range of the digital video signal. Because the setup level and the dynamic range of the digital video signal are corrected in accordance with the classification, dull black, dull white, black crushing, and white crushing will not occur with any type of input digital video signal, and a picture can be displayed at a brightness level with a high fidelity to the input digital video signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A and 8B show a full range LUT and a limited range LUT respectively.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
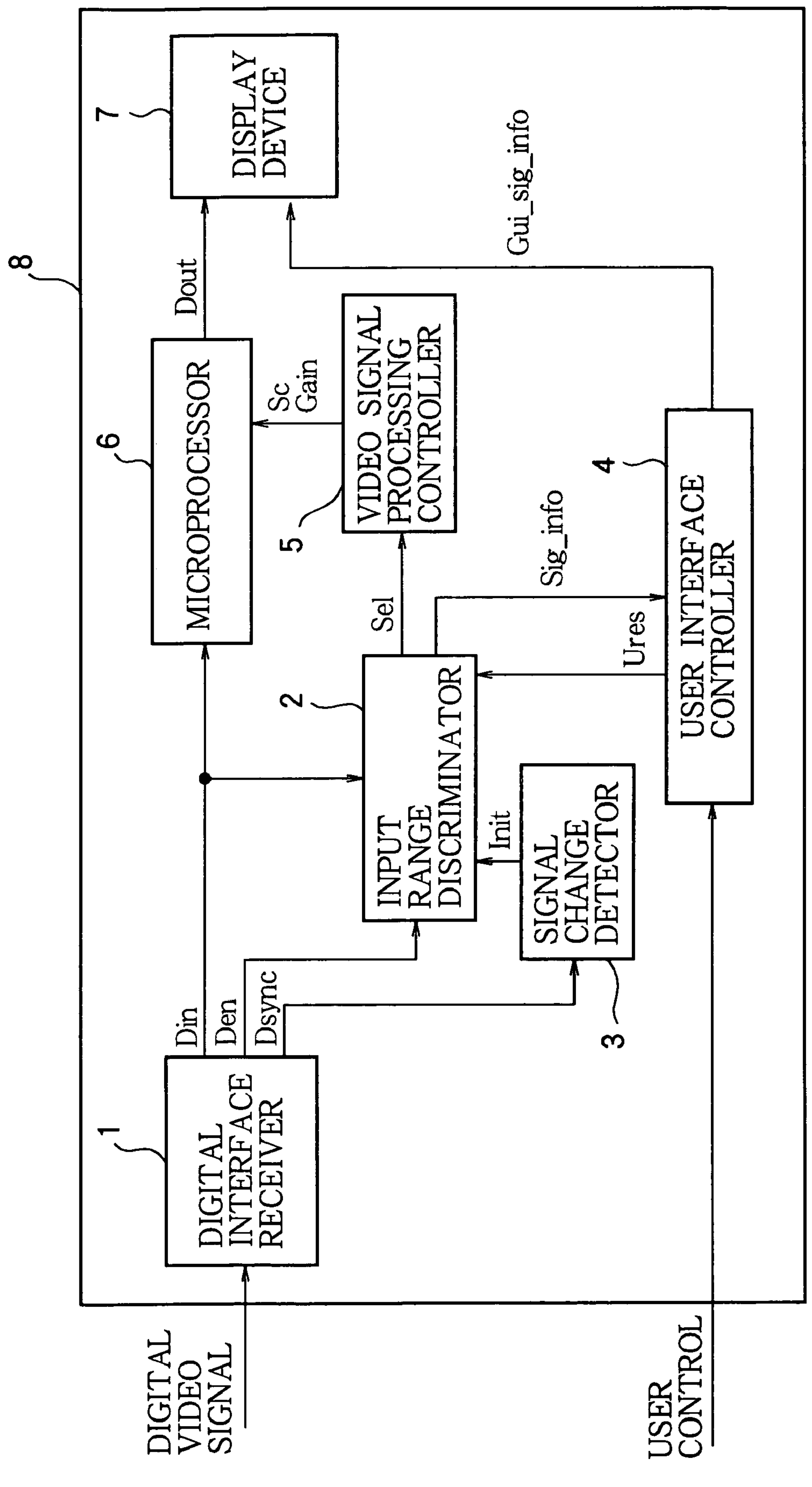
FIG. 1 is a block diagram showing a configuration of an image display apparatus according to a first embodiment of the present invention.

FIG. 1 is a block diagram showing a configuration of an image display apparatus 8 according to a first embodiment of the present invention. As shown in FIG. 1, the image display apparatus 8 of the first embodiment includes a digital interface receiver 1, an input range discriminator 2, a signal change detector 3, a user interface controller 4, a video signal processing controller 5, a microprocessor 6, and a display device 7. The image display apparatus 8 is an apparatus equipped with a digital interface such as a television set, a projection display apparatus, and a PC monitor.

The digital interface receiver 1 receives a digital video signal from an apparatus including a digital interface such as DVI or HDMI (registered trademark) incorporated into a DVD player, a STB, and the like, decodes the received digital video signal to parallel data Din, and outputs a signal Den, which indicates the effective image periods and a synchronization signal Dsync.

The input range discriminator 2 detects the maximum value Dmax and the minimum value Dmin of the video signal Din, with respect to the duration represented by the effective image period signal Den output from the digital interface receiver 1, determines whether the video signal Din is a signal of the full range type or a signal of the limited range type, and outputs a discrimination signal Sel. The input range discriminator 2 also outputs a signal Sig_info, which includes the discrimination of whether the video signal Din is a signal of the full range type or a signal of the limited range type, and the maximum value Dmax and the minimum value Dmin of the video signal Din, to the user interface controller 4. The input range discriminator 2 further returns the discrimination signal Sel to a value indicating a signal of the limited range type when it receives a signal change detection signal Init from the signal change detector 3 or a user reset signal Ures from the user interface controller 4.

The signal change detector 3 senses either or both of a transition to a no-signal state and a change in the signal format of the input digital video signal, on the basis of the synchronization signal Dsync input from the digital interface receiver 1, and outputs the detection signal Init to the input range discriminator 2.

The user interface controller 4 outputs a user reset signal Ures to the input range discriminator 2 when the user makes a request to reset the result of input range discrimination. The user interface controller 4 also builds GUI data Gui_sig_info for displaying information on the display device 7, on the basis of the signal Sig_info output from the input range discriminator 2, which includes the information of the discrimination and the maximum value Dmax and the minimum value Dmin of the video signal Din, and outputs the GUI data Gui_sig_info to the display device 7.

The video signal processing controller 5 receives the discrimination signal Sel from the input range discriminator 2 and outputs an amount of the setup cancel Sc and a dynamic range correction coefficient Gain to the microprocessor 6.

The microprocessor 6 performs a computation of the video signal Din output from the digital interface receiver 1, on the basis of the amount of the setup cancel Sc and the dynamic range correction coefficient Gain output from the video signal processing controller, and outputs a computed video signal Dout to the display device 7. The display device 7 displays a picture based on the video signal Dout and a picture based on the GUI data Gui_sig_info individually or in a superimposed manner.

Figure 2:
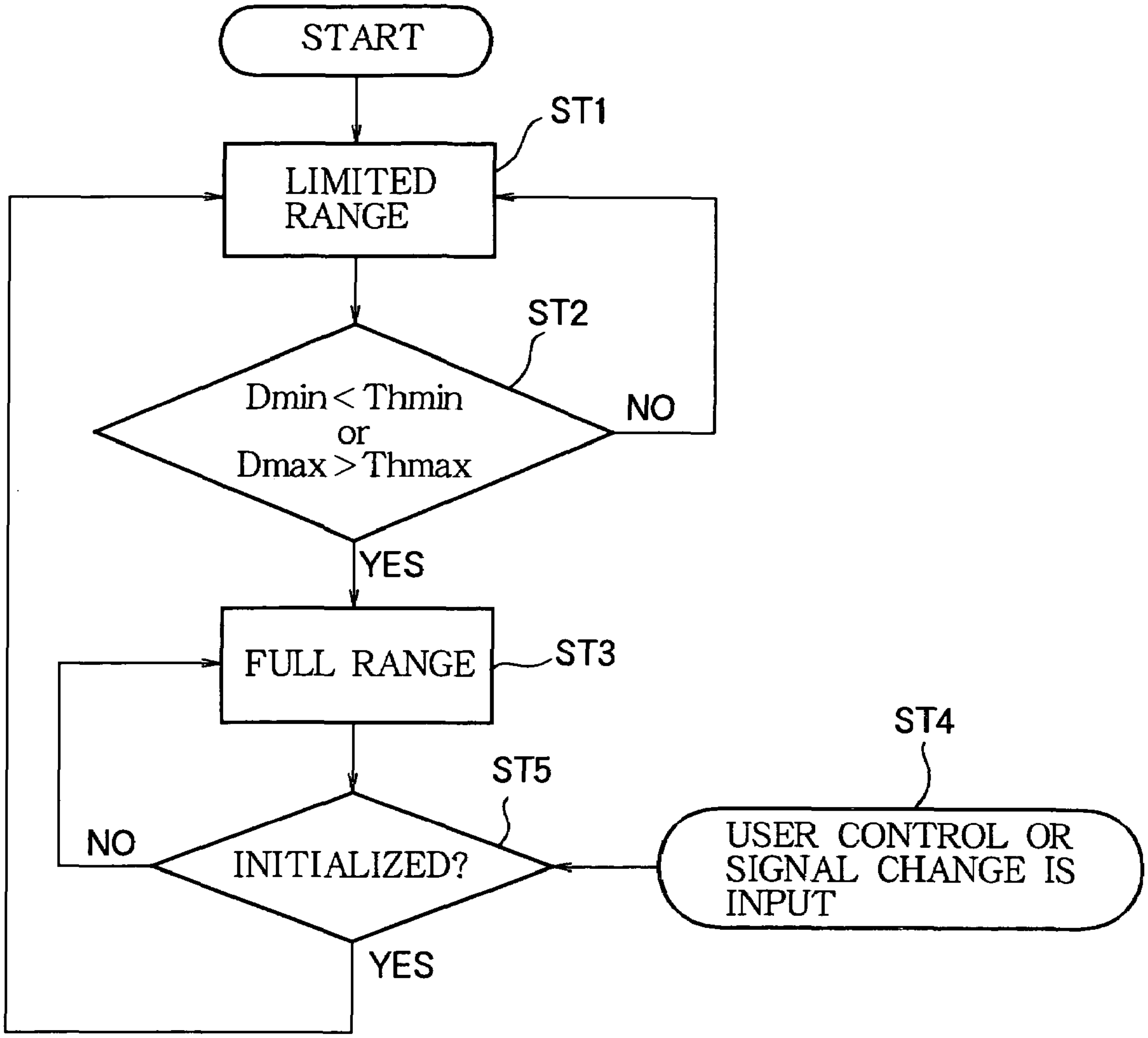
FIG. 2 is a flow chart showing the operation of the input range discriminator shown in FIG. 1.

FIG. 2 is a flow chart showing the operation of the input range discriminator 2. The HDMI (registered trademark) standard specifies that the black level is level 0 and the white level is level 255 in the 8-bit RGB color space of the full range and that the black level is level 16 and the white level is level 235 in the limited range. Any value from levels 1 to 16 can be selected as a black discrimination threshold Thmin, and any value from levels 235 to 254 can be selected as a white discrimination threshold Thmax.

As shown in FIG. 2, the input range discriminator 2 first starts the processing of the limited range (step ST1). Then, the input range discriminator 2 compares the minimum value Dmin and the maximum value Dmax of the video signal with the threshold Thmin and the threshold Thmax respectively (step ST2). If $Dmin<Thmin$ or $Dmax>Thmax$, it is determined that a full range video signal has been input. Otherwise, that is, if $Dmin \geqq Thmin$ and $Dmax \leqq Thmax$, it is determined that a limited range video signal has been input (step ST3). If the input video signal is determined to be a signal of the full range type, the input range discriminator 2 maintains the discrimination until the signal change detection signal Init or the user reset signal Ures is input. If the signal change detection signal Init or the user reset signal Ures is input (step ST4), the minimum value Dmin and the maximum value Dmax of the input range discriminator 2 are initialized (step ST5). Then, the input video signal is determined to be the signal of the limited range type, and the processing of the limited range is performed (step ST1). With this operation, the input range discriminator 2 automatically determines whether the input video signal is the signal of the limited range type or the signal of the full range type.

Figure 3:
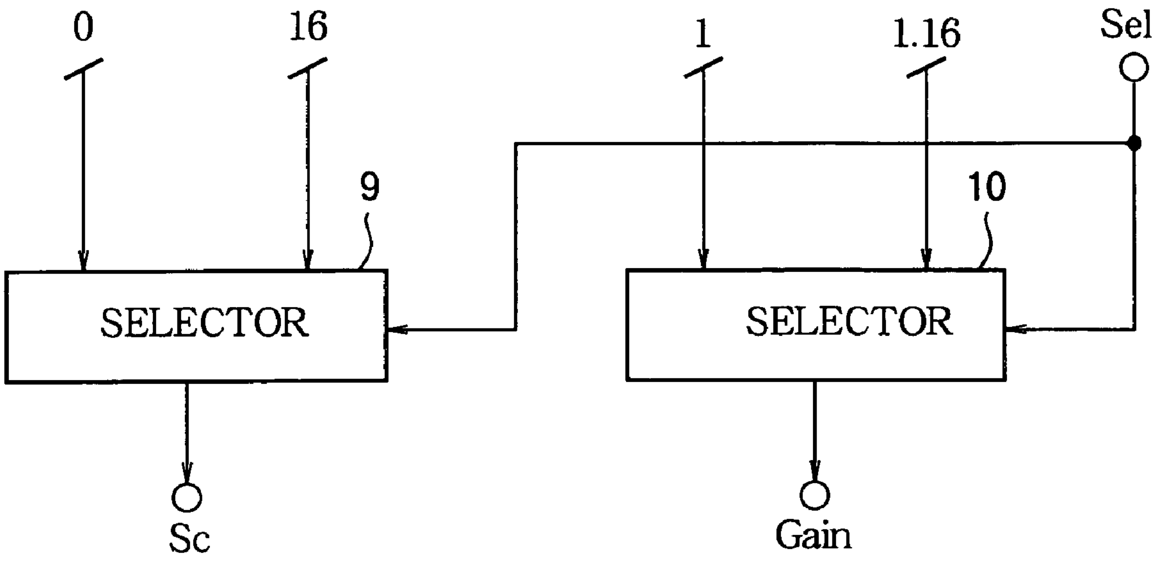
FIG. 3 is a diagram showing a configuration of the video-signal processing controller shown in FIG. 1.

FIG. 3 shows a configuration of the video signal processing controller 5, which includes a first selector 9 and a second selector 10. The selector 9 selects either an input value 0 or 16 in accordance with the discrimination signal Sel from the input range discriminator 2, and outputs either 0 or 16 as the amount of the setup cancel Sc of the black level. The selector 10 selects an input value 1 or 16 in accordance with the discrimination signal Sel from the input range discriminator 2, and outputs the selected value as the dynamic range correction coefficient Gain of the white level and the black level. The value 1.16 of the dynamic range correction coefficient Gain is obtained from the following expression:

$$(\text{Number of gray levels in the full range})/(\text{Number of gray levels in the limited range})=256/(235-15)$$

$$=256/220$$

$$=1.16$$

Figure 4:
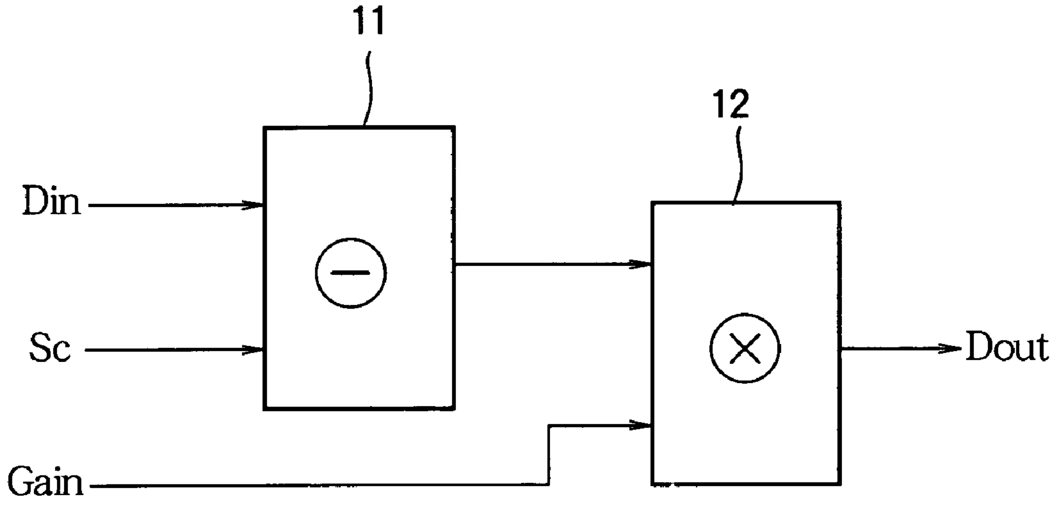
FIG. 4 is a diagram showing a configuration of the microprocessor shown in FIG. 1.

FIG. 4 shows a configuration of the microprocessor 6. The microprocessor 6 includes a subtractor 11 and a multiplier 12. The subtractor 11 subtracts the amount of the setup cancel Sc from the video signal Din input from the digital interface receiver 1. The multiplier 12 multiplies a value output from the subtractor 11 by the dynamic range correction coefficient Gain. The product Dout is output to the display device 7.

Figure 5B:
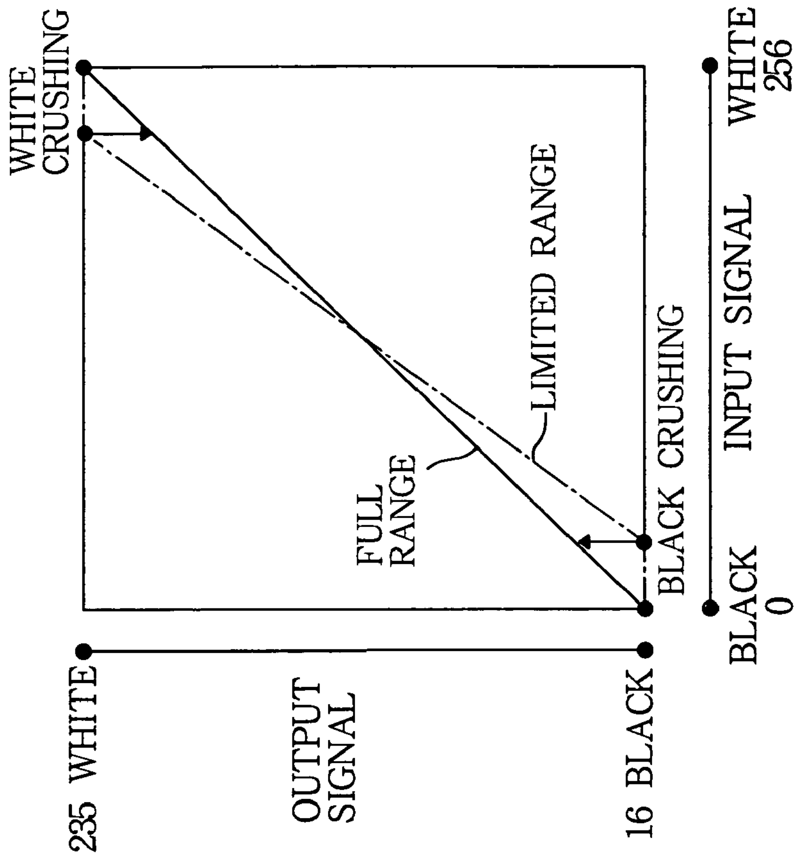
FIGS. 5A and 5B show graphs representing the video display states when a limited range video signal is input and when a full range video signal is input, respectively.
Figure 5A:
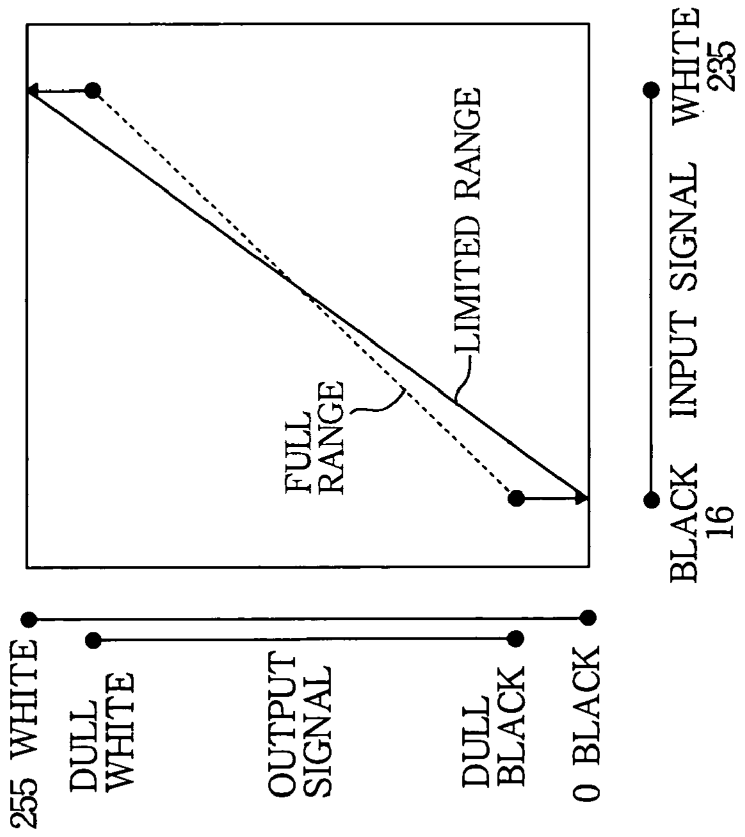

FIG. 5A and FIG. 5B are graphs representing the relationships between the input video signal and the output signal. FIG. 5A shows a video display state when a signal of the limited range type is input while FIG. 5B shows a video display state when a signal of the full range type is input. In FIG. 5A and FIG. 5B, the horizontal axis represents the level of the input signal, and the vertical axis represents the level of the output signal.

With reference to FIG. 5A, the video display state with the input of a signal of the limited range type will be described. When a video signal of the limited range type, where the black level corresponds to level 16 and the white level corresponds to level 235, is input to an image display apparatus supporting the full range alone, the black level and the white level of the output video signal become level 16 and level 235 respectively, as represented by a broken line in FIG. 5A. The original black level of 0 of the image display apparatus supporting just the full range increases by 16, and the original white level of 255 decreases by 20. If an amount of the setup cancel Sc of 16 and a dynamic range correction coefficient Gain of 1.16 are selected to change the input range of the image display apparatus to the limited range, a video signal assigning the black level to level 0 and the white level to level 255 can be output, as represented by a solid line shown in FIG. 5A. The image display apparatus of the first embodiment can prevent the problems of "dull black" and "dull white" from occurring when a video signal of the limited range type is input.

With reference to FIG. 5B, the video display state with the input of a video signal of the full range type will be described.

When a video signal of the full range type, where the black level corresponds to level 0 and the white level corresponds to level 255, is input to an image display apparatus supporting just the limited range, the selection of an amount of the setup cancel Sc of 16 and a dynamic range correction coefficient Gain of 1.16 causes black crushing and white crushing to occur, as represented by a chain line shown in FIG. 5B. If an amount of the setup cancel Sc of 0 and a dynamic range correction coefficient Gain of 1 are selected to automatically select a signal of the full range type, a video signal can be output without black crushing or white crushing, as represented by a solid line shown in FIG. 5B.

As has been described above, the image display apparatus 8 of the first embodiment can prevent dull black, dull white, black crushing, and white crushing from occurring, by automatically discriminating whether a video signal of the full range type or a video signal of the limited range type is input from the digital interface receiver 1 and can display a picture at a brightness level closest to that of the input video signal.

In addition, the user interface controller 4 builds GUI data in accordance with the signal Sig_info including the result of discrimination whether the input video signal is a signal of the full range type or a signal of the limited range type and the maximum value Dmax and the minimum value Dmin of the video signal Din, and the display device 7 displays the GUI data Gui_sig_info, so that the user can see whether a video signal of the full range type or a video signal of the limited range type is currently input.

Second Embodiment

In many cases, the digital interface receiver 1 is configured to output an 8-bit digital video signal. However, the display device 7 supports more bits, such as 10-bit or 12-bit digital video signal input, in many cases. The microprocessor 6 in the image display apparatus 8 of the first embodiment includes the subtractor 11 and the multiplier 12 and cannot perform a non-linear computation. Because the computation is restricted by the number of bits that can be processed by the multiplier or in the video signal processing, a quantization error occurs. An image display apparatus 8*a* of a second embodiment is configured to display a picture at a brightness level closest to that of the input video signal, irrespective of whether a 10-bit digital video signal or a 12-bit digital video signal is input to the display device 7.

Figure 6:
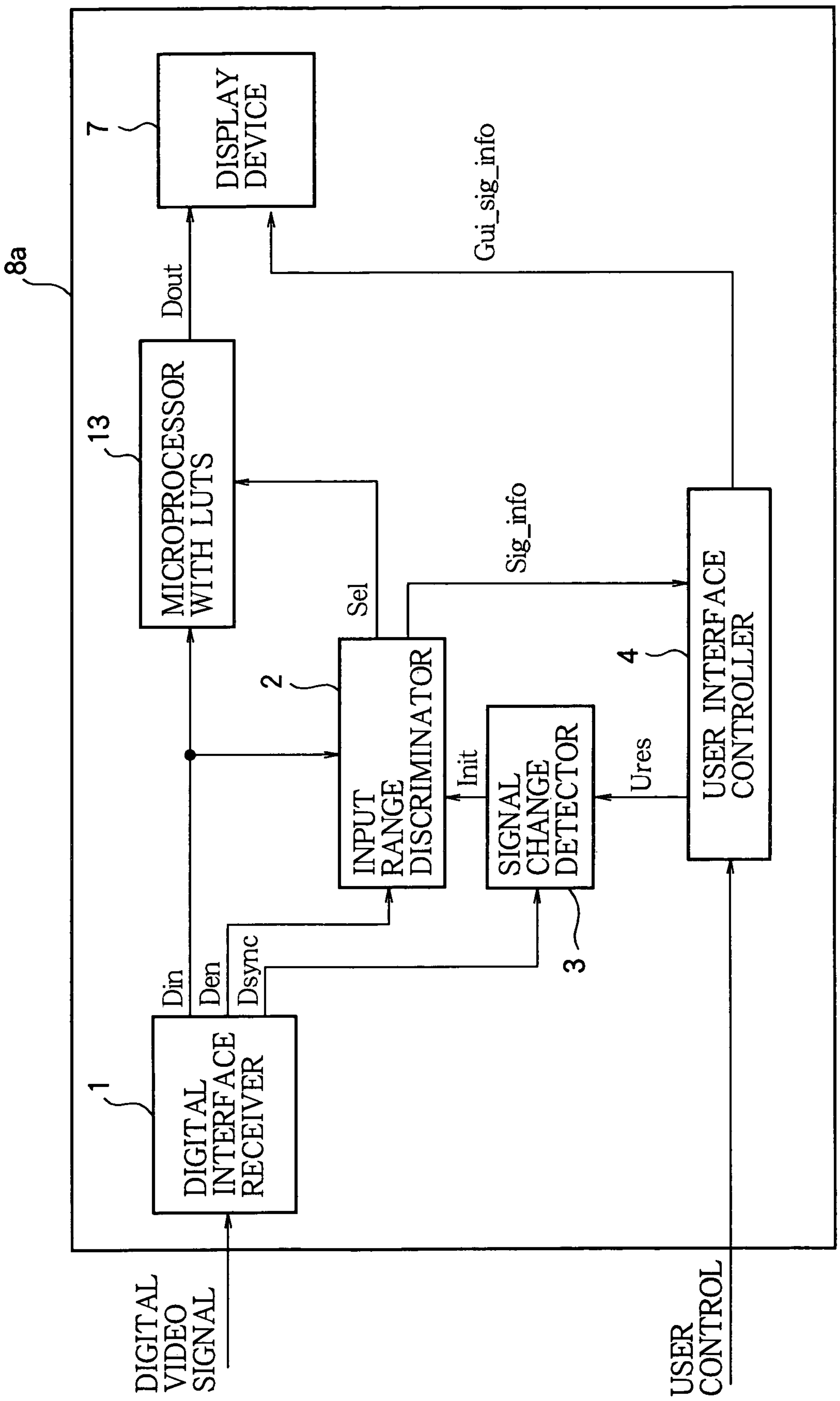
FIG. 6 is a block diagram showing a configuration of an image display apparatus of a second embodiment of the present invention.

FIG. 6 is a block diagram showing a configuration of the image display apparatus 8*a* of the second embodiment of the present invention. An element which is the same as or equivalent to an element shown in FIG. 1 is denoted by a like reference numeral in FIG. 6. As shown in FIG. 6, the image display apparatus 8*a* of the second embodiment includes a digital interface receiver 1, an input range discriminator 2, a signal change detector 3, a user interface controller 4, a microprocessor 13 with look-up tables (LUTs), and a display device 7.

The digital interface receiver 1 receives a digital video signal from an apparatus equipped with a digital interface such as DVI and HDMI (registered trademark) incorporated in a DVD player and STB, decodes the received digital video signal to parallel data Din, and outputs a signal Den, which indicates the effective image period, and a synchronization signal Dsync.

The input range discriminator 2 detects the maximum value Dmax and the minimum value Dmin of the video signal Din, with respect to the duration indicated by the effective image period signal Den output from the digital interface receiver 1, and outputs a discrimination signal Sel, which indicates whether the signal is a signal of the full range type or a signal of the limited range type.

The microprocessor 13 with LUTs has a plurality of LUTs. The LUT to be used for the video signal Din input from the digital interface receiver 1 is selected in accordance with the discrimination signal Sel from the input range discriminator 2. The microprocessor 13 with LUTs performs a computation of the video signal by using the selected LUT, and outputs the computation result Dout to the display device 7.

Figure 7:
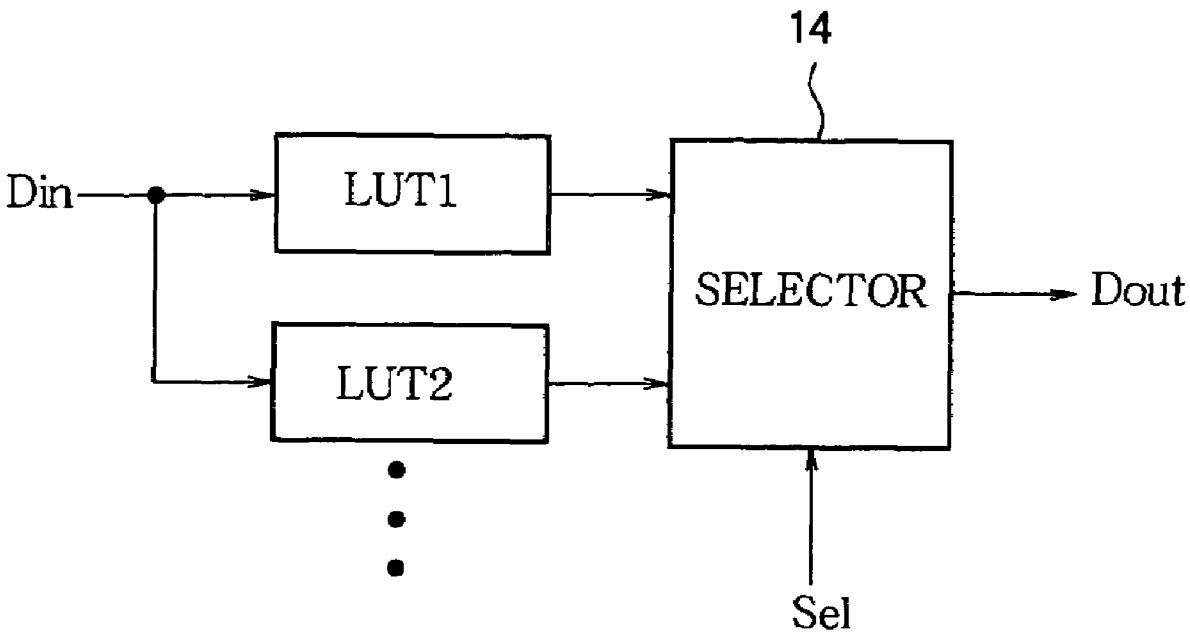
FIG. 7 is a diagram showing a configuration of the microprocessor with LUTs shown in FIG. 6.

FIG. 7 shows a configuration of the microprocessor 13 with LUTs. As shown in FIG. 7, the microprocessor 13 with LUTs has a plurality of LUTs (LUT1, LUT2, and so on) and a selector 14 for selecting an LUT in accordance with the discrimination signal Sel. The selector 14 selects one of the LUTs for the video signal Din input from the digital interface receiver 1, in accordance with the discrimination signal Sel from the input range discriminator 2, performs a computation, and outputs the computation result Dout. The contents of the LUT may be rewritable from the outside. With a rewritable LUT, the user can make a correction as desired.

FIG. 8 shows a full range LUT and a limited range LUT for 8-bit input and 12-bit output, for instance. The full range LUT (LUT1) assigns input levels 0 to 255 to output levels 0 to 4095. The limited range LUT (LUT2) assigns input levels 0 to 15 to output level 0, input levels 16 to 235 to output levels 0 to 4095, and input levels 236 to 255 to output level 4095.

If the multiplier 12 (FIG. 4) of the image display apparatus 8 of the first embodiment receives 8-bit input and uses an 8-bit multiplication coefficient, the output is limited to 8 bits. Even if the multiplier output is LUT-converted from 8 bits to 12 bits, the influence of the quantization error is great.

Figure 9:
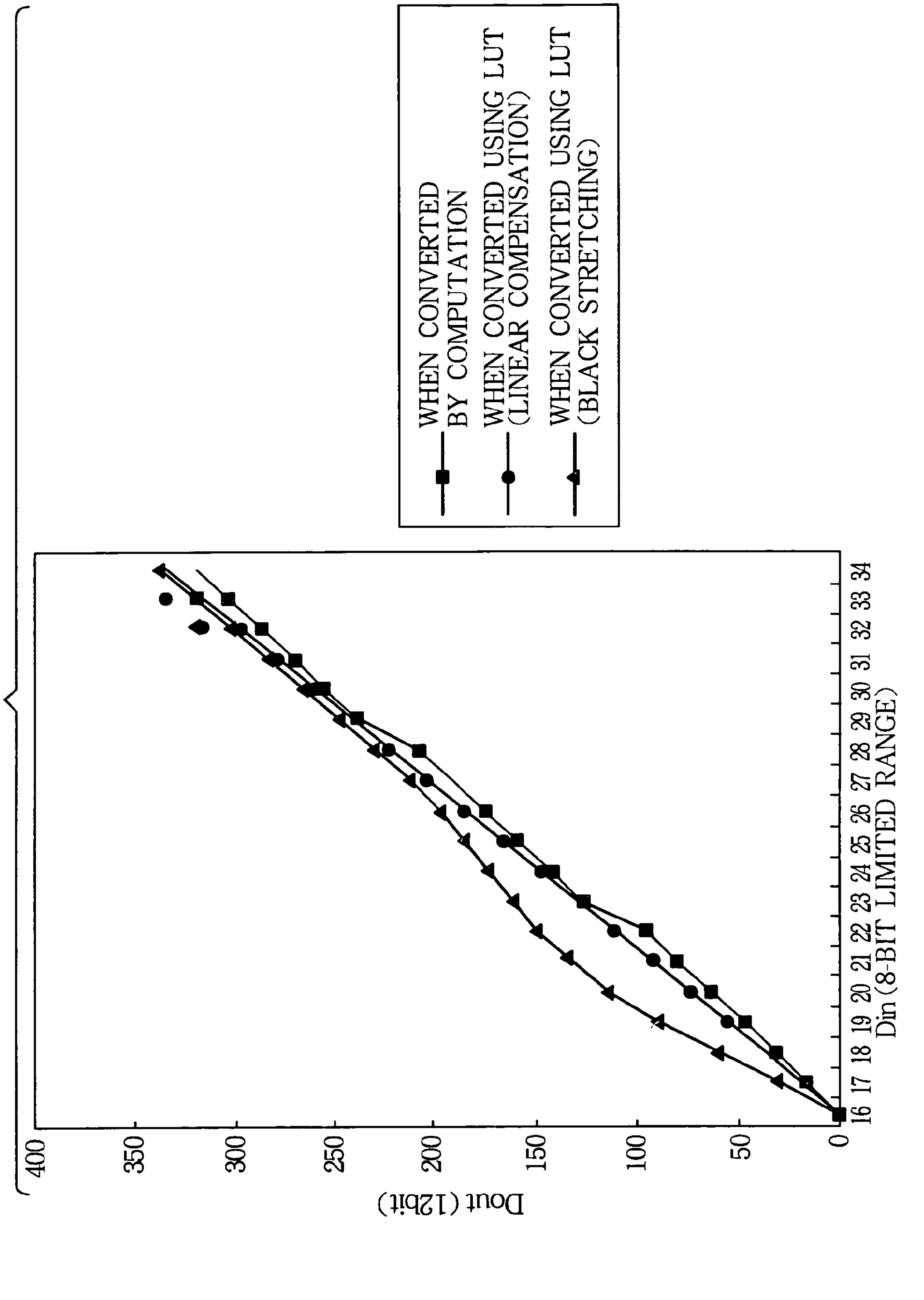
FIG. 9 shows differences in output when the bit count is converted by computation (first embodiment) and when the bit count is converted using an LUT (second embodiment).

FIG. 9 shows the output video signal Dout obtained from the 8-bit limited range video signal input when the signal is converted to 12 bits by computation (represented by a line connecting squares), when the signal is converted by linear compensation using the LUT (represented by a line connecting circles), and when the signal is converted by black stretching using the LUT (represented by a line connecting triangles).

The linear compensation by the LUT uses a linear function of the simplest form, and input level ranges from 16 to 34, for instance. The 12-bit output data $y_{12}$ obtained from 8-bit input data Din through the linear compensation by the LUT can be calculated as follows:

$$y_{12}=(Din-16)\times255/(235-16)$$

When the 8-bit input data Din is converted to the limited range by means of the subtractor 11 and the multiplier 12 of the image display apparatus 8 of the first embodiment, the 8-bit output data $y_8$ of the multiplier 12 can be calculated as follows:

$$y_8=(Din-16)\times255/(235-16)$$

Then, the 8-bit output $y_8$ is shifted by 4 bits (multiplied by 16) to obtain 12-bit data.

FIG. 9 shows that the computation using the LUT performed in the second embodiment (line connecting circles) allows smooth grayscale representation.

In the second embodiment, black stretching (represented by a line connecting triangles) as shown in FIG. 9, white stretching, and other video optimization can be conducted. A computation using the LUT enables a nonlinear computation. For instance, black stretching is possible by raising the output level with respect to the dark-side input, as represented by the line of LUT conversion (black stretching) in FIG. 9. This can improve the reproducibility of the dark side. In the same way, white stretching is possible, by lowering the output level with respect to the light-side input.

As has been described above, the image display apparatus 8*a* of the second embodiment can prevent dull black, dull white, black crushing, or white crushing from occurring by automatically discriminating whether a video signal of the full range type or a video signal of the limited range type is input from the digital interface receiver 1, can display a picture at a brightness level closest to that of the input digital video signal, and can also minimize quantization noise.

The second embodiment is the same as the first embodiment, except for the points described above.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image display apparatus comprising:

an input range discriminator which discriminates a type of an input digital video signal, on the basis of a setup level and a dynamic range of the digital video signal;

a signal processor which corrects the setup level and the dynamic range of the digital video signal, on the basis of a result of the discrimination made by the input range discriminator; and a display device which displays a picture based on the video signal corrected by the signal processor;

wherein the signal processor comprises:

a video signal processing controller which controls an amount of setup cancel and a correction coefficient of a dynamic range, on the basis of the result of the discrimination made by the input range discriminator; and a microprocessor which performs a computation for correcting the setup cancel and the dynamic range, on the basis of the amount of the setup cancel and the correction coefficient of the dynamic range, which are output from the video signal processing controller.

2. The image display apparatus according to claim 1, wherein the microprocessor performs a linear computation to correct the dynamic range.

3. An image display apparatus comprising:

an input range discriminator which discriminates a type of an input digital video signal, on the basis of a setup level and a dynamic range of the digital video signal;

a signal processor which corrects the setup level and the dynamic range of the digital video signal, on the basis of a result of the discrimination made by the input range discriminator; and a display device which displays a picture based on the video signal corrected by the signal processor;

wherein the signal processor comprises a microprocessor with LUTs, which includes a plurality of LUTs, selects one of the plurality of LUTs on the basis of the result of the discrimination made by the input range discriminator, and performs the computation for correcting the setup cancel and the dynamic range using the selected LUT.

4. The image display apparatus according to claim 3, wherein the computation for correcting the dynamic range performed by the microprocessor with LUTs is a nonlinear computation.

5. An image display apparatus comprising:

an input range discriminator which discriminates a type of an input digital video signal, on the basis of a setup level and a dynamic range of the digital video signal;

a signal processor which corrects the setup level and the dynamic range of the digital video signal, on the basis of a result of the discrimination made by the input range discriminator; and a display device which displays a picture based on the video signal corrected by the signal processor;

wherein the digital video signal discriminated by the input range discriminator is a full range type, where each value of quantization bit number of the digital video signal is assigned to gray levels respectively, or a limited range type, where some values of quantization bit number of the digital video signal are assigned to gray levels respectively.

6. The image display apparatus according to claim 5, wherein the input range discriminator detects a maximum value and a minimum value of the digital video signal in an effective image period, determines that the digital video signal is a signal of the full range type when the maximum value is greater than a predetermined first threshold or when the minimum value is smaller than a predetermined second threshold, and determines that the digital video signal is a signal of the limited range type when the maximum value is smaller than or equal to the predetermined first threshold and when the minimum value is greater than or equal to the predetermined second threshold.

7. The image display apparatus according to claim 5, further comprising a user interface controller which receives from a user a reset request to reset the result of the discrimination made by the input range discriminator, wherein the input range discriminator determines that the range of the digital video signal is the limited range when the user interface controller detects the reset request.

8. The image display apparatus according to claim 5, wherein the user interface controller outputs a signal for displaying information indicating whether the digital video signal input to the display device is the signal of the full range type or the signal of the limited range type.

* * * * *